Jan. 7, 1930.     W. R. MAGEE     1,742,479
GAUGE FOR SHEET EDGE BENDING MACHINES
Filed Dec. 1, 1927     2 Sheets-Sheet 2
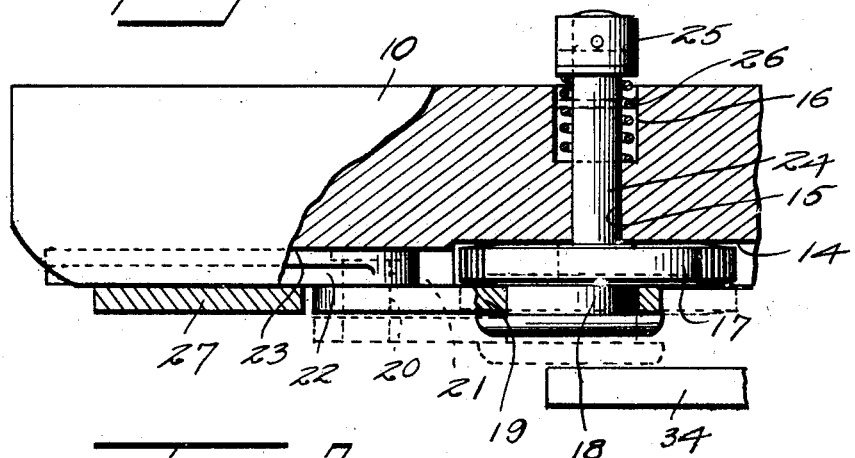
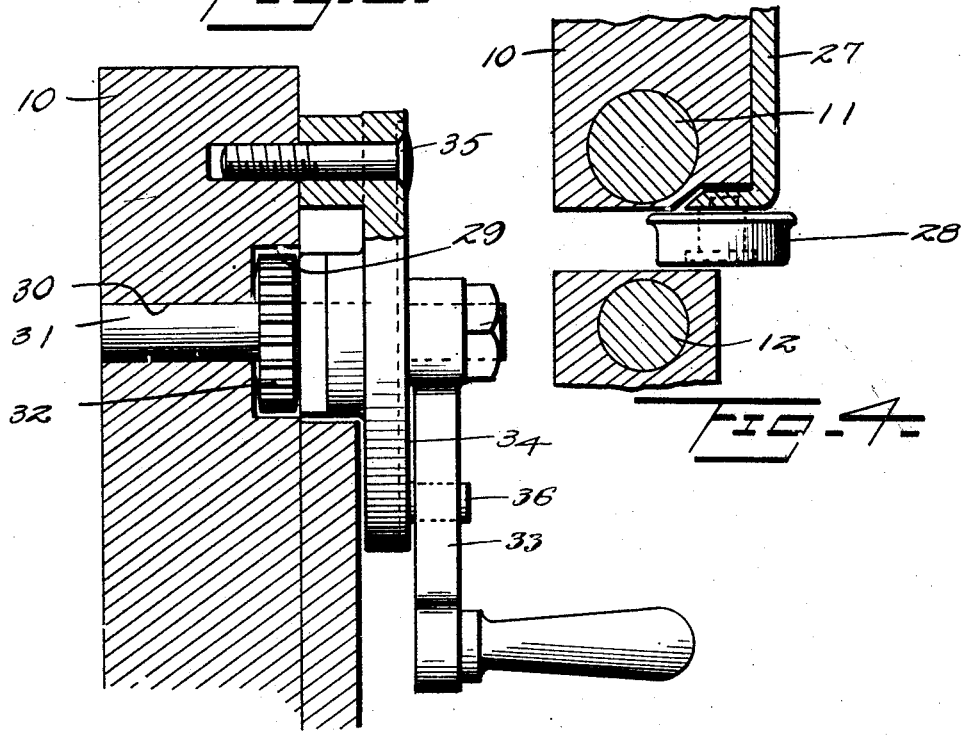
Inventor
W. R. Magee
By Watson E. Coleman
Attorney Patented Jan. 7, 1930

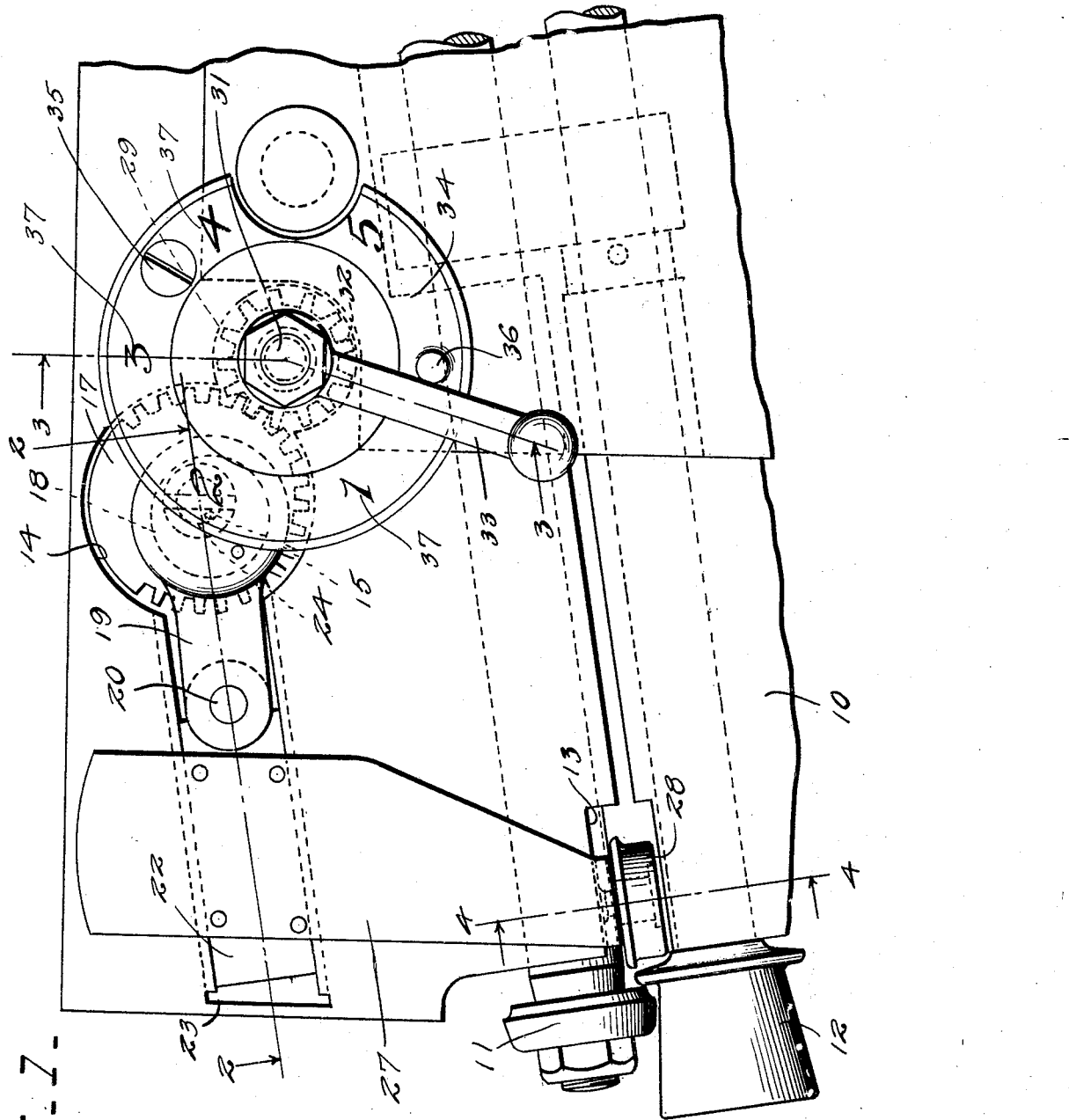

1,742,479

UNITED STATES PATENT OFFICE

WILBER R. MAGEE, OF ANN ARBOR, MICHIGAN

GAUGE FOR SHEET-EDGE-BENDING MACHINES

Application filed December 1, 1927. Serial No. 237,067.

This invention relates to gauges for sheet edge bending machines and more particularly to an edge gauge for use with sheet metal wiring machines of the type shown in my prior Patents, Nos. 943,118, granted December 14, 1909, and 1,048,984, granted December 31, 1912.

An important object of the invention is to provide a structure giving an accurate gauge of the amount turned at the edge of a sheet.

Heretofore, the gauges employed comprise rolls or rigid hard steel elements against which the edge of the sheet contacted which were mounted upon fixed supports, so that the alteration of the position of the gauger required stopping of the machine for loosening of one or more securing elements, the adjustment of the gauge, resecuring thereof and restarting of the machine. The time lost in these operations is very considerable, and accordingly the cost of complicated edge turning operations was rendered prohibitive. It will, of course, be obvious that where the edge of a sheet, which is to be turned, is straight or regularly curved, the gauging operation is comparatively simple. Where, however, the edge is not straight and has an irregular curvature or has a sinuous edge, if a smooth turning operation is to be performed, the gauge must be reset for each change in either the degree of curvature or the direction of curvature. Accordingly, an important object of the present invention is the provision of a gauging device, by means of which the changes of the position of the gauge necessary to provide a proper edge turn upon sheets of this character, may be made while the machine is in operation and without stopping the turning operation.

A further object of the invention is to provide in a device of this character a construction such that compensation may be readily had for wear upon the gauge surface, so that the gauge may be maintained in a fixed relation to the turning rolls.

A still further object of the invention is to provide a device of this character, wherein the gauge and its support may be readily removed and replaced by another gauge structure, wherein the gauging element occupies a different relation to the bending roll, so that the use of the device in a wide range of bending operations is rendered possible.

A still further object of the invention is to provide a device of this character, which may be readily and cheaply produced, is readily manipulatable, durable and efficient in service and a general improvement in the art.

These and other objects I attain by the construction shown in the accompanying drawings, wherein for the purpose of illustration is shown a preferred embodiment of my invention and wherein:—

Figure 1 is a fragmentary side elevation of a sheet metal edge bending machine showing guide mechanism constructed in accordance with my invention;

Figure 2 is a section on the line 2—2 of Figure 1, parts being shown in their normal positions in solid lines and in dotted lines in the position which they occupy when the pitman is shifted to permit removal and replacement of a slide;

Figure 3 is a section on the line 3—3 of Figure 1;

Figure 4 is a section on the line 4—4 of Figure 1.

Referring now more particularly to the drawings, the numeral 10 generally designates the body frame of a sheet metal edge turning machine and 11 and 12 turning rolls supported thereby, which may be of any usual or ordinary character. The machine body affords inwardly of the rolls a slot 13 lying between the axes of the rolls and extending transversely of the frame.

In accordance with my invention, I form in the side face of the frame, at that side thereof from which the sheet is fed, a recess 14, at the center of which the frame is provided with a transverse bore 15, the end of which remote from the recess is enlarged, as at 16. Arranged within the recess 14 is a gear 17 having secured thereto at the outer face thereof an eccentric 18 upon which is mounted a pitman 19. The outer end of the pitman 19 has a pin opening 20 and adapted to be engaged by a pin 21 on a slide 22 operating in a groove 23. This groove 23 opens through the outer face of the upper member of the frame 10, so that the slide may be removed therefrom by shifting the same longitudinally through this open end. The gear 17 is mounted upon an axle 24, which extends entirely through the bore 15 and its enlargement 16 at the opposite side of the frame, where it has applied thereto a collar 25. Between the collar 25 and the inner wall of the enlargement of the bore, a spring 26 surrounds the axle, normally forcing the gear 17 into frictional engagement with the inner wall of the recess 14. By forcing the axle 24 inwardly against the action of this spring, the gear, eccentric and pitman may be forced outwardly from the side of the frame, so that the pin 20 disengages from the pitman and the slide may be removed.

The slide 22 has secured thereto a bracket 27 upon the lower end of which is secured the gauge element 28, at present designated as a roll. The lower end of this bracket may be either bent inwardly, so that it extends into the slot 13, or outwardly, depending upon the position which the gauge is to occupy with relation to the turning rolls 11 and 12. In practice, a number of slides 22 with their brackets 27 and gauge elements 28 are provided, which may be readily substituted for one another by the above described operation, disengaging the pitman from the slide which is in use, removal of this slide and the substitution thereof for another slide. It is here pointed out that situations requiring changes of guide elements on the same piece of work seldom occur.

In the face of the frame adjacent the recess 14 is formed a second recess 29, at the axis of which is formed a bearing socket 30. Within this bearing socket is rotatably mounted a shaft 31 having secured thereto a gear 32 operating in the recess 29 and meshing with the gear 17. To the outer end of this shaft is rigidly secured an operating handle 33 and between the operating handle and gear, a gauge disk 34 is disposed, which is secured to the side face of the frame by a screw, generally designated at 35. The inner face of the gauge disk is bossed at the screw opening to maintain this gauge disk in sufficiently spaced relation to the outer face of the eccentric 18 and pitman 19 to permit movement thereof, disengaging the pitman from the slide. Upon the outer face of the disk, a stop pin 36 is provided against which the handle 33 will engage in one position of the gear. From this stop pin, the face of the disk is provided with indicia 37 for the guidance of the operator.

In the use of the device, wherever it is necessary to change the position of the gauge element 28 with relation to the rolls 11 and 12, this is accomplished by rotating the handle 33. It will be obvious that after an operation has been performed on the first of a series of similar articles, the gauge sequence will be readily repeated upon succeeding articles. For example, a worker operating upon such a series and after completing the first of the series, having found the successive gauge settings to provide an accurately and smoothly turned edge to be say 3—2—1—5—3 upon the dial, needs but to repeat these settings in connection with subsequent articles of the same kind. As the changes can be made without checking the operation of the machine, it will be obvious that the operation thereof is materially speeded up and the cost of production accordingly reduced. It will be obvious that the friction provided by the gears 17 and 32 and due to the natural reluctance of an eccentric to rotate under the influence of thrust upon its pitman, the gauge will remain in position where set without the need of exterior holding devices, although the same can be provided, if desired. The gear 17 may either be a complete gear or may be as illustrated of the segmental type. Where it is found after a considerable usage, that due to looseness of the pivots or wear upon the parts, the gauge element 28 is not sufficiently advanced in one setting, the setting may be readily changed. This is accomplished by removing the dial and turning the gear 17 to the necessary distance to return the gauge to its ordinary normal or zero position, which is the position which it occupies when the handle 33 is engaged with the stop pin 36. The dial and small gear are then replaced, care being taken that the handle 33 remains in engagement with the stop pin. By making the gears 17 and 32 of fine pitch, a very accurate adjustment may be obtained in this manner.

Since the construction hereinbefore set forth is obviously capable of a certain range of change and modification without materially departing from the spirit of the invention, I do not limit myself to such specific structure except as hereinafter claimed.

I claim:—

1. In a sheet metal edge bending machine, bending rolls, a slide shiftable toward and away from the general plane of the rolls, a guide supported from the slide in proximity to the rolls, an eccentric, a pitman connecting the eccentric and slide and means for rotating the eccentric.

2. In a sheet metal edge bending machine, bending rolls, a slide shiftable toward and away from the general plane of the rolls, a guide supported from the slide in proximity to the rolls, an eccentric, a pitman connecting the eccentric and slide, means for rotating the eccentric and means frictionally resisting rotation of the eccentric.

3. In a sheet metal edge bending machine, bending rolls, a slide shiftable toward and away from the general plane of the rolls, a guide supported from the slide in proximity to the rolls, an eccentric, a pitman connecting the eccentric and slide and disengageable from the slide by movement in a plane perpendicular to the slide, a mounting for the pitman permitting such movement thereof while yieldably resisting the same, and means for rotating the eccentric.

4. In a sheet metal edge bending machine, bending rolls, a slide shiftable toward and away from the general plane of the rolls, a guide supported from the slide in proximity to the rolls, an eccentric, a pitman connecting the eccentric and slide and disengageable from the slide by movement in a plane perpendicular to the slide, a mounting for the pitman permitting such movement, a spring resisting said movement and by its tension applying friction resisting rotation of the eccentric, and means for rotating the eccentric.

5. In a sheet metal edge bending machine, a machine frame, bending rolls carried by the frame, the frame having a slideway, a slide in said slideway and movable therein toward and away from the general plane of the rolls, a guide supported by the slide in proximity to the rolls, a shaft rotatably and longitudinally shiftably mounted in the frame, an eccentric carried by said shaft, a pitman engaging the eccentric at one end and at its opposite end operatively engaging the slide, a gear carried by said shaft, a second shaft having a handle whereby it may be rotated and a gear meshing with the gear of the first named shaft and a dial coacting with said handle.

6. In a sheet metal edge bending machine, a machine frame, bending rolls carried by the frame, the frame having a slideway, a slide in said slideway and movable therein toward and away from the general plane of the rolls, a guide supported by the slide in proximity to the rolls, a shaft rotatably and longitudinally shiftably mounted in the frame, an eccentric carried by said shaft, a pitman engaging the eccentric at one end and at its opposite end operatively engaging the slide, a gear carried by said shaft, a second shaft having a handle whereby it may be rotated, a gear meshing with the gear of the first named shaft, a dial coacting with said handle, and a spring urging the first named shaft in a direction frictionally engaging said gear with said frame.

7. In a sheet metal edge bending machine, a machine frame, bending rolls carried by the frame, the frame having a slideway, a slide in said slideway and movable therein toward and away from the general plane of the rolls, a guide supported by the slide in proximity to the rolls, a shaft rotatably and longitudinally shiftably mounted in the frame, an eccentric carried by said shaft, a pitman engaging the eccentric at one end and at its opposite end operatively engaging the slide, a gear carried by said shaft, a second shaft having a handle whereby it may be rotated, a gear meshing with the gear of the first named shaft, a dial coacting with said handle, the operative connections of the slide and pitman being disengageable by movement of the first named shaft in the general direction of its axis and a spring resisting movement of the shaft in said direction.

8. In a sheet metal edge bending machine, a machine frame, bending rolls carried by the frame, the frame having a slideway, a slide in said slideway and movable therein toward and away from the general plane of the rolls, a guide supported by the slide in proximity to the rolls, a shaft rotatably and longitudinally shiftably mounted in the frame, an eccentric carried by said shaft, a pitman engaging the eccentric at one end and at its opposite end operatively engaging the slide, a gear carried by said shaft, a second shaft having a handle whereby it may be rotated, a gear meshing with the gear of the first named shaft, a dial coacting with said handle, the operative connections of the slide and pitman being disengageable by movement of the first named shaft in the general direction of its axis and a spring resisting movement of the shaft in said direction, said spring maintaining the gear of the first named shaft in frictional engagement with the frame.

9. In a sheet metal edge bending machine, bending rolls, a slide shiftable toward and away from the general plane of the rolls, a guide supported from the slide in proximity to the rolls, a rotatable element having connection with the guide whereby the guide is shifted as the element is rotated, friction means resisting rotation of the rotatable element, and means for rotating the rotatable element operable during operation of the bending rolls.

10. In a sheet metal edge bending machine, bending rolls, a slide shiftable toward and away from the general plane of the rolls, a guide supported from the slide in proximity to the rolls, a rotatable element operable during feeding of the sheet to the rolls, a connection between the rotatable element and the slide whereby the slide is shifted as the element is rotated, said rotatable element being mounted for axial movement, and a spring resisting such movement, the connection between the rotatable element and slide being disconnected by axial movement of the rotatable element.

11. In a sheet metal edge bending machine, bending rolls, an edge guide for the sheet fed to the rolls and mounted for adjustment toward and away from the general plane of the rolls, a rotatable member, means connecting the guide to the rotatable member, a handle connected to the rotatable member, an index surrounding the rotatable member, and a stop carried by the index and adapted to be engaged by the handle in one position of the guide.

In testimony whereof I hereunto affix my signature.

WILBER R. MAGEE.